(12) United States Patent
Stevenson

(10) Patent No.: US 6,634,627 B1
(45) Date of Patent: Oct. 21, 2003

(54) PNEUMATIC SPRING WITH ADJUSTABLE STOP FOR STROKE CONTROL

(75) Inventor: Robin Stevenson, Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/010,880

(22) Filed: Nov. 13, 2001

(51) Int. Cl.[7] ............................. F16F 9/02; F16F 9/58
(52) U.S. Cl. ........................... 267/64.12; 188/300
(58) Field of Search .................. 267/64.12; 188/300

(56) References Cited

U.S. PATENT DOCUMENTS

| 3,883,126 A | | 5/1975 | Nicholls ..................... 267/65 |
|---|---|---|---|
| 3,938,793 A | | 2/1976 | Kaptanis et al. ............ 267/120 |
| 3,977,712 A | | 8/1976 | Northrop .................... 292/338 |
| 4,307,875 A | | 12/1981 | Schnitzius et al. .......... 267/120 |
| 4,309,027 A | * | 1/1982 | Molders et al. ........... 267/64.12 |
| 5,299,787 A | * | 4/1994 | Svensson ................. 267/64.12 |
| 5,702,083 A | * | 12/1997 | Lai .......................... 267/64.12 |
| 5,944,376 A | | 8/1999 | Buchanan, Jr. ........... 296/146.4 |
| 6,126,222 A | | 10/2000 | Nguyen et al. ............... 296/56 |

\* cited by examiner

Primary Examiner—Matthew C. Graham

(57) ABSTRACT

A pneumatic spring having a piston and rod assembly operatively mounted in a gas-charged cylinder tube which expands when an associated closure such as a lift gate of a vehicle is released from its locked position. The force of the pneumatic spring assists the swinging movement of the lift gate on its hinges relative to the bodywork of the vehicle. As the lift gate opens, the pneumatic spring expands with the piston rod telescoping outwardly of the cylinder tube, which operates to pull a dust tube normally surrounding the cylinder tube. This around the tube until a stop ring secured to the end of the dust engages a stop collar operatively mounted on the cylinder tube. This positively limits the expansion of the gas spring and thereby establishes the open position of the lift gate. This open position of the lift gate can be manually changed by physically turning the dust tube in one direction to advance the stop collar threadably mounted on the cylinder tube to increase the amount that the gas spring can expand or in an opposite rotational direction to retract the stop collar on the cylinder tube to decrease the amount of gas spring expansion and amount of lift gate opening.

6 Claims, 3 Drawing Sheets

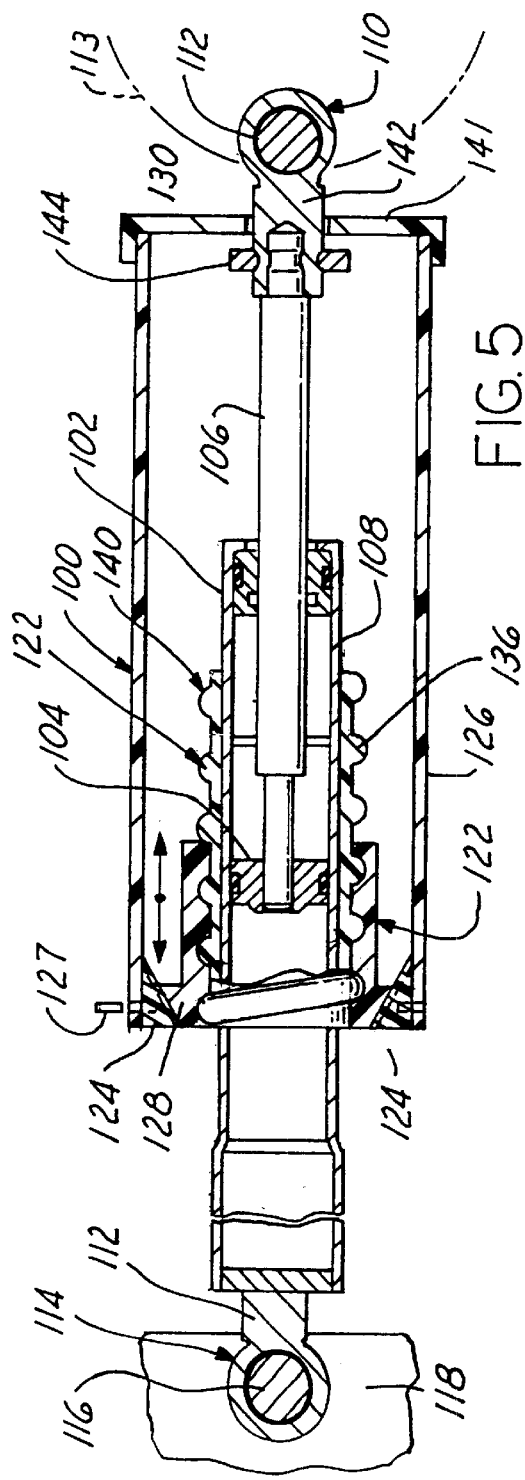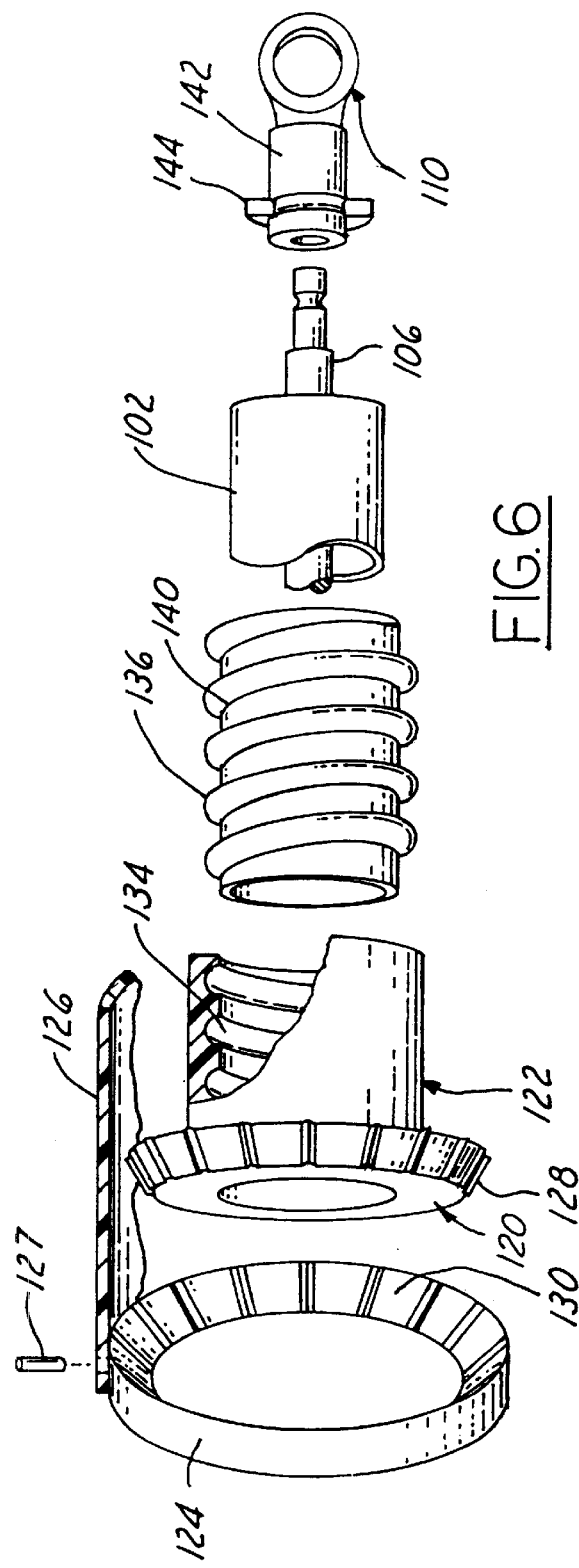

PNEUMATIC SPRING WITH ADJUSTABLE STOP FOR STROKE CONTROL

BACKGROUND OF THE INVENTION

1. Field of the Invention

This invention relates to a telescoping pneumatic spring having a stroking piston operatively mounted in a cylinder tube and normally capable of gas forced outward stroking movement form a starting telescoped position to an extended stop position and more particularly to a new and improved pneumatic spring controlling the swinging movement of an associated closure and incorporating an adjustable stop mechanism to vary the relative outward stroke of the piston and the open position of the closure to an infinite number of stop positions.

2. Brief Description of the Prior Art

Prior to the present invention, various pneumatic spring units have been devised for controlling the motion of automotive body closures such as hoods, trunk lids, lift gates and other access doors. In U.S. Pat. No. 3,938,793 issued Feb. 17, 1976 to Kapanis et al. for Pneumatic Spring With Stop Mechanism, a pneumatic spring of the piston and cylinder type is equipped with an internal stop mechanism which limits the outward stroke of the piston and rod relative to the cylinder to accordingly limit the movement of an associated trunk lid to a predetermined degree of opening. In U.S. Pat. No. 6,126,222 issued Oct. 3, 2000 to Nguyen et al. for Lift Gate Assembly, an auxiliary cable unit is utilized to limit the amount of opening of a lift gate whose opening is assisted by separate pneumatic springs.

While such prior art constructions may meet their objectives, some are difficult to adjust while others involve auxiliary stop units separate from the pneumatic spring. Accordingly, such constructions do not meet new and higher standards for straight forward and simplified construction providing improved control of pneumatic spring stroking particularly those used to advantageously assist physical effort in displacing doors and other closures to a wide range of predetermined stop positions. In sharp contrast to the prior art construction, the present invention overcomes the various disadvantages of the prior art and provides a basic and readily adjustable pneumatic spring that can be readily set to control the amount of travel of associated closures such as lift gates for vehicles to establish a wide range of positive stop positions in accordance with opening requirements.

It is a feature, object and advantage of this invention to provide a new and improved pneumatic spring for assisting the opening of access doors or other closures of vehicles which feature a built-in adjustable stop that can be readily adjusted to a wide range of stop positions to positively limit the extent of closure opening. With this construction, the closure can be set to an infinite number of convenient closure stop positions readily accessible by the person normally using the closure in accordance with their physique or range of motion capability.

It is another feature, object and advantage of this invention to provide a new and improved piston type pneumatic spring for use with access doors of vehicles featuring an adjustable stop on a cylinder tube and an associated dust tube with a fixed stop ring that provides a built-in tool for varying the stroke of the spring to fixed stops.

These and other objects and features of the invention will become more apparent from the following detailed description and drawings in which:

FIG. 5 is a longitudinal, partly-sectioned view of another embodiment of this invention comprising a gas spring with another version of the stroke limiting mechanism in accordance with the present invention;

FIG. 6 is an exploded view of internal components of the stop limiting mechanism of the gas spring of FIG. 5.

Detailed Description

Figure 1:
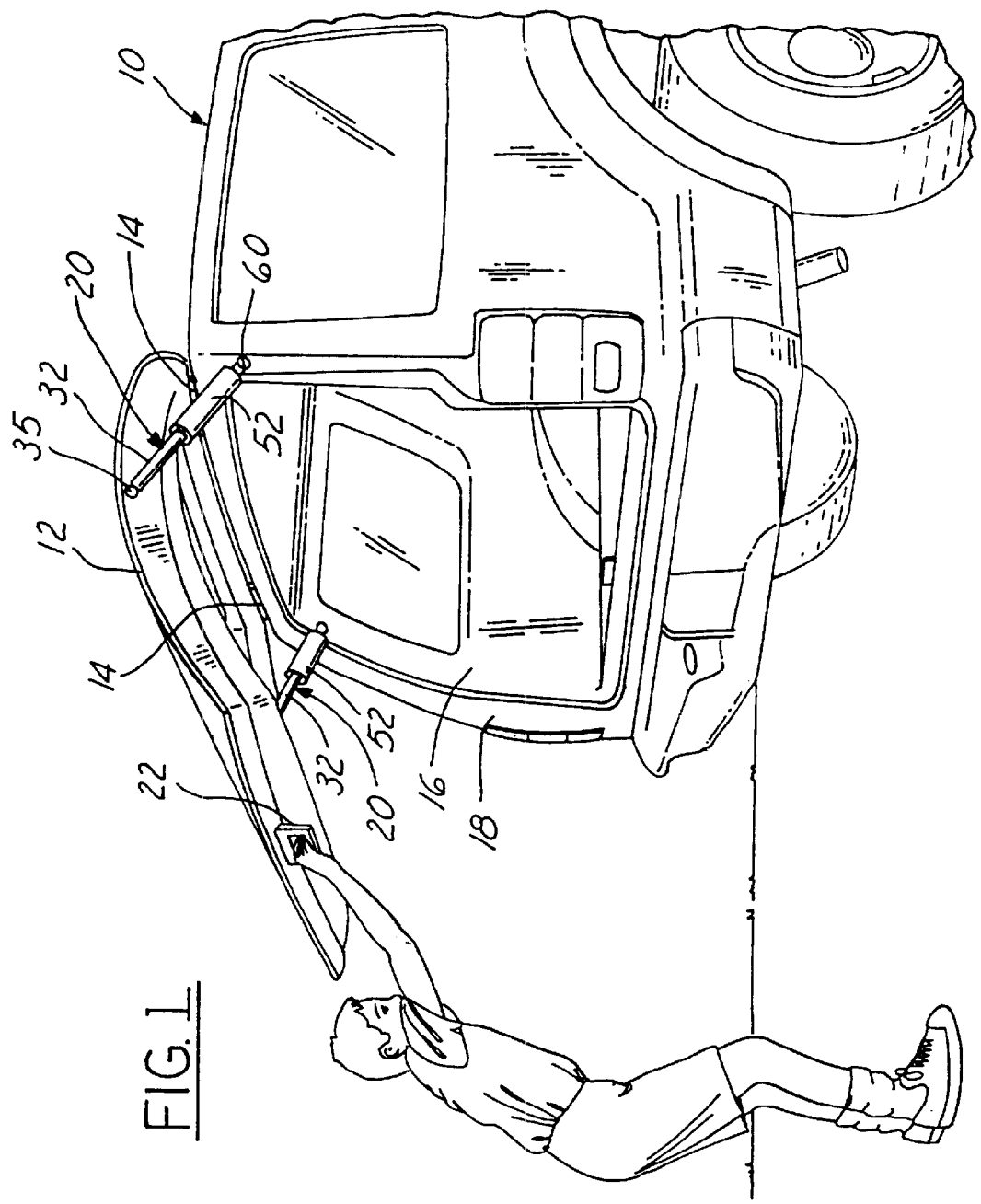
FIG. 1 is a pictorial view of a lift gate of a vehicle being manually grasped and lowered from a positive stop position into a closed position.

Turning now in greater detail to the drawings there is shown in FIG. 1 a portion of a vehicle 10 having a rear lift gate 12 mounted by upper hinges 14 for swinging movement between a closed and locked position and an opened position with respect to lift gate opening 16 provided in the bodywork 18 of the vehicle. A pair of gas springs 20 operatively mounted between the lift gate and the vehicle bodywork are employed to assist the manual opening of the lift gate and to establish the extent of the lift gate opening to any one of a number of convenient stop positions to accommodate the physiques or physical requirements of a wide range of users.

For example, the open position of the lift gate can be easily varied and positively established at a low position relative to the support surface for the vehicle. This permits a person of small stature or a handicapped person such as one in a wheelchair to easily reach and grasp the pull down handle 22 operatively attached to the lower edge portion of the lift gate and i subsequently pull down and shut the lift gate. The lift gate stop position can be readily increased so that the open position is at an intermediate position and convenient for a person of average height or still further increased to set the stop position at a higher station for the accessibility of a person of large stature.

Figure 2:
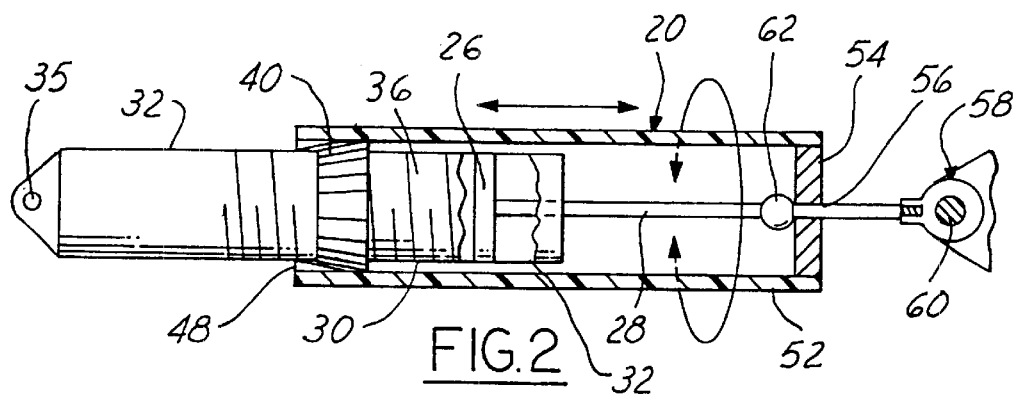
FIG. 2 is a schematic view of a gas spring operatively mounted between a base and a closure illustrating the adjustment of the internal stop.
Figure 3:
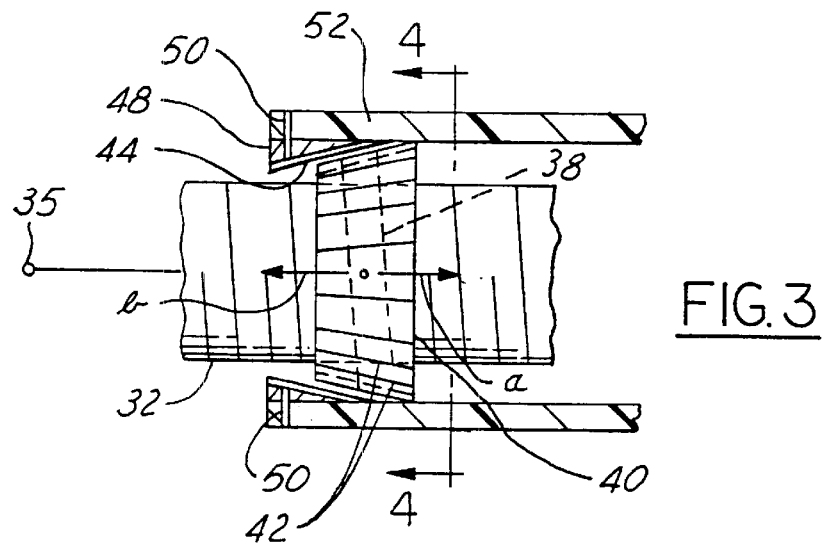
FIG. 3 is an enlarged schematic view of the adjustment portion of the gas spring in FIG. 2.
Figure 4:
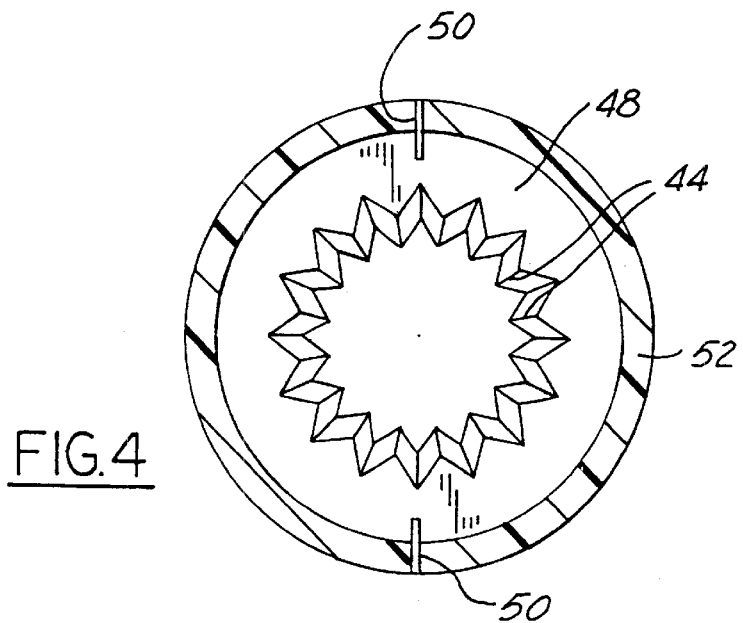
FIG. 4 is schematic view of the stop member of the gas spring taken generally along lines 4—4 of FIG. 3 with the cylinder tube and internal components omitted.

FIGS. 2, 3 and 4 diagrammatically illustrate one embodiment of the gas spring of this invention in which a piston 26 and piston rod 28 are connected into an assembly that is operatively mounted for telescopic movement within a cylinder tube 32 charged with air, nitrogen or other inert gas at a predetermined pressure greater than atmospheric pressure. The pressurized gas in the cylinder tube provides the force on the differential area of the piston effecting the expansion of the gas spring by the stroking of the piston in the cylinder tube until the predetermined stop point is reached.

The stop point can be readily adjusted to any one of an infinite number of stop positions by adjusting certain components of the gas spring. More particularly in this invention the cylinder tube 32 has its outboard end operatively connected by pivot 35 to an edge portion of the lift gate 12. The cylinder tube further has an external helical thread 36 formed thereon which extends a predetermined distance along the length of the cylinder tube to establish different stop positions for the lift gate. This thread preferably has a right hand lead and operatively meshes with the internal helical thread 38 of a stop collar 40 operatively mounted on the cylinder tube so that the stop collar can be turned and adjustably moved to selected positions along the length thereof. Moreover, the stop collar 40 is profiled to have the general configuration of a truncated cone whose conically tapered outer surface is provided with splines 42 capable of meshing with complementary splines 44 formed in the internal surface of a stop ring 48 secured by radial pins 50 to the opened end portion of a protective support or dust tube 52.

The inboard end of the dust tube 52 may be provided with an end wall 54 that has a centralized passage 56 formed therein through which the outboard end of the piston rod 28 slidably extends. The piston rod connects with the shank of a ring mount 58, which receives a pivot pin 60 to pivotally mount the piston rod to the vehicle 10. A protuberance such as a ball 62 is fixed at a predetermined position on the piston rod inboard of the end wall 54 of the dust tube. This protuberance 62 operates to contact the end wall 54 to limit the relative linear motion of the dust tube and the piston rod to thereby establish the position of the internal stop ring 48 when the pneumatic spring expands with the opening of the lift gate. With the position of the stop ring selected and positively established, the stroke of the pneumatic spring is terminated when the stop collar physically contacts the inner stop ring of the dust tube.

For establishing a full or maximized opening of the lift gate, the stop collar 40 is threadibly moved on the cylinder tube in the direction of arrow "a" to a selected point toward the inboard end of the cylinder tube 32. Preferably, the stop collar is positioned on the cylinder tube at its furthermost position relative to the pivot pin 35, providing the attachment point of the cylinder tube to the lift gate, and from the stop ring 48. With this setting, the lift gate can be released from its closed and locked position and swung on its hinges. The pneumatic spring reactively begins to expand with the piston rod beginning to stroke out of the cylinder tube. As it does so, the protuberance 62 on the piston rod engages the end wall of the dust tube and pulls the dust tube downwardly relative to the cylinder tube until the splines on stop ring 48 mesh with those on the stop collar 40. This contact establishes the wide open stop position of the lift gate relative to the opening in the bodywork of the vehicle. released from its closed and locked position and swung on its hinges. The pneumatic spring reactively begins to expand with the piston rod beginning to stroke out of the cylinder tube. As it does so, the protuberance 62 on the piston rod engages the end wall of the dust tube and pulls the dust tube downwardly relative to the cylinder tube until the splines on stop ring 48 mesh with those on the stop collar 40. This contact establishes the wide open stop position of the lift gate relative to the opening in the bodywork of the vehicle.

When the lift gate is subsequently moved toward the closed position, the pneumatic spring will be compressed. Under such closure force, the cylinder tube will be telescoped on the piston rod and the stop collar 40 separates from the stop ring 48 of the dust tube. The dust tube 52 is free to slide to a telescoped position over the cylinder tube and is positioned for another lift gate opening cycle.

To adjust and shorten the effective stroke of the gas spring, the pneumatic cylinder can be fully extended so that the splines on the collar and sleeve engage. This can be done by moving the lift gate to its opened position. The dust tube is then manually rotated so that the stop collar is advanced relative to the cylinder tube in the direction of arrow "b" on the cylinder tube toward the pivot 35. This turns the lift gate downwardly on its hinges to a predetermined new stop position such as would be suitable for a person of smaller stature. The lift gate can be closed and locked with assurance that on subsequent opening, the subsequent travel thereof will be reduced and set at the new stop position by the interference between the adjusted stop collar on the cylinder tube and stop ring on the dust sleeve.

This adjustment can be further changed for a lesser or greater lift gate opening. The adjustment can be made as frequently as desired to deal with temporary situations or may be set and forgotten by the customer or dealer on vehicle delivery to address permanent conditions.

FIGS. 5 and 6 illustrate another preferred embodiment of the invention in which a gas spring 100 embodying the principals of the embodiment of FIGS. 1–4 is employed to control the extent of opening of a lift gate or other closure of a vehicle. More particularly the gas spring has a cylinder tube 102 in which a piston 104 is operatively mounted. The piston 104 is connected to a piston rod 106 that extends axially from one side thereof through the transversely extending end wall of the cylinder tube 108 into connection with a ring mount 110 whose cylindrical opening receives a pivot pin 112 conveniently secured the body work 113 of a vehicle. The cylinder tube 108 extends linearly and has a ring mount 114 on the outboard end thereof that operatively connects with a pivot pin 116 mounted in conventional manner to a closure 118 such as a lift gate.

As in the first embodiment, the gas spring 100 is charged with an inert gas pressurized above atmospheric to effect expansion of the spring and provide assist in swinging the closure to its open position. The limit of this opening is adjustably established by the conical head 120 of an adjustable stop collar 122 contacting the mating inner conical surface of a stop ring 124. This ring is fixed in the end of a cylindrical dust tube 126 by a radial pin 127 or other suitable fastener. These two surfaces are respectively provided with mating splines 128, 130 that, when mated, are use in the adjustment of the stop collar relative to the cylinder tube as in the first embodiment of this invention.

More particularly, the stop collar 122 is provided with internal helical thread 134 which operatively meshes with the external helical thread 136 of a sleeve 140 of suitable material such as nylon that is heat shrunk or otherwise securely mounted on the cylinder tube 102.

The dust tube 126 comprises a cylindrical tube extending from the stop ring 124 around the cylinder tube and position rod to a terminal end wall 141. As shown the end wall has a centralized cylindrical opening slidably receiving the cylindrical shank 142 of the ring mount 110. The dust tube 126 and can axially slide on the shank 142 between the rings mount and a stop ring 144 secured at a fixed position on the shank. This construction gives the dust tube the capability of being manually turned on its axis to effect adjustment of the stop collar on the cylinder tube 102 as in the previous embodiment.

A pair of gas springs is usually employed to provide assist in the opening of the lift gate as in the first embodiment. In the event a lift gate opening adjustment is to be made, the lift gate may be opened until the head 120 of the stop collar moves into physical engagement with the splines of the stop collar meshing with the splines of the stop ring. The adjustment of the stop collar can then be made by the appropriate rotation of the dust tube. For example, the dust tube can be turned in one direction to decrease the opening of the lift gate or in an opposite direction to move the stop collar provision further down on the cylinder tube to increase the opening.

In the illustrated embodiments, both gas springs are adjusted to the same stop positions although it may be acceptable to use only a single lift spring or use one of a pair of associated lift spring for setting the stop position of the closure.

While preferred embodiments of the invention have been shown and described to illustrate the invention, other embodiments employing the concepts and ideas of this invention are possible. Accordingly, the embodiments of the invention in which an exclusive property of privilege is claimed are defined as follows:

What is claimed is:

1. A pneumatic spring unit for assisting the opening of a door structure pivotally mounted to the body structure of an automotive vehicle with respect to an opening therein comprising an elongated gas charged cylinder tube for operative connection to one of said structures, a piston and rod providing an assembly for operative connection to the other of said structures and operatively mounted in said cylinder tube for stroking movement between a first position in which the closure is in closed position with respect to said opening and in which said piston and rod assembly is telescopically collapsed to a predetermined fully retracted position with respect to the cylinder tube and a second position in which the closure is in a fully opened position with respect to the opening and in which the piston and rod assembly is telescopically displaced to a fully extended and terminal position with respect to said cylinder tube, an elongated support tube extending around said cylinder tube and operatively connected to said rod, a fixed stop carried by said support tube extending radially inwardly toward said cylinder tube, a stop contact member carried on said cylinder tube disposed radially outward thereof for operative engagement with said fixed stop for limiting the extent of stroking movement of said piston and rod assembly relative to said cylinder tube to a plurality of positions proximate to said second position, and an adjustable connection between said cylinder tube and said stop contact member operative to allow said stop contact member to be adjustably fixed at any of a number of positions on said cylinder tube for limiting the stroking movement of said piston and rod assembly to fixed positions between said first and second positions.

2. The pneumatic spring unit of claim 1 wherein said adjustable connection between said cylinder tube and said stop contact member comprises meshing helical threads carried by said cylinder tube and said stop contact member and wherein said support tube is a dust tube mounted for limited axial sliding and rotational movement on said piston rod so that said dust tube can be employed as a tool for operative connection with and for subsequent turning said stop contact member on said cylinder tube and adjusting stroke of said piston and rod assembly relative to said cylinder tube.

3. A gas spring unit to assist the opening of a closure unit of a vehicle relative to an opening for said closure unit in the body work of the vehicle comprising, a cylinder tube charged with an inert pressurized gas greater than atmospheric pressure for operative connection to one part of said vehicle, a piston operatively mounted for linear movement in said cylinder tube, a piston rod having one end connected to said piston and extending axially therefrom through said cylinder tube and out of one end thereof for operative connection with another part of the vehicle, said piston and rod defining an assembly which is normally forced to a predetermined extended and telescoped position with respect to said cylinder tube, a stop tube operatively mounted on said piston rod and encompassing at least a portion of said cylinder tube, a fixed stop portion on said stop tube, a stop collar adjustably mounted on said cylinder tube for engaging said stop portion on said stop tube for limiting the outward telescopic stroke of said piston and rod assembly relative to said cylinder tube for limiting the degree of opening of said closure unit with respect to said opening in the body work of the vehicle.

4. The gas spring unit of claim 3 and wherein said stop tube comprises a dust tube covering and protecting said piston rod, said dust tube having an end wall supporting said dust tube for rotary and limited axial movement with respect to said piston rod, said stop portion having internal splines formed thereon, said stop collar having external splines for operative engagement with the internal splines of said stop portion of said dust tube so that said dust tube can be manually grasped and rotated to adjust the position of said stop collar on said cylinder tube.

5. A gas spring unit for assisting the opening of a closure in the body of an automotive vehicle comprising a cylinder tube for connection to one part of the vehicle, a piston and rod assembly for connection to another part of the vehicle operatively mounted in said cylinder tube and movable between a first position in which the piston and rod is telescopically collapsed to a predetermined fully retracted position with respect to the cylinder tube and a second position in which the piston and rod is telescopically moved to a fully extended and terminal position with respect to said cylinder tube, an elongated support tube extending around said cylinder tube and operatively rotatably and slidably connected by one end thereof to said piston rod between limit stops thereon, a stop carried by said support tube on the free end thereof, and an adjustable contact member carried on said cylinder tube for operative contact with said stop carried by said support tube for limits the stroking movement of said spring unit expanding from the first position a fixed position intermediate thereof, and meshing helical thread construction between said adjustable contact member and said cylinder tube so that said contact member can be moved to thereby adjust the amount of opening of said closure.

6. A gas spring unit to assist the opening of a closure of a vehicle relative to an opening for said closure in the body work of a vehicle wherein said closure and body work define different parts of the vehicle, said gas spring unit comprising a cylinder tube charged with an inert pressurized gas greater than atmospheric pressure for operative connection to one part of said vehicle, a piston operative mounted for linear movement in said cylinder tube, a piston rod having one end connected to said piston and extending axially therefrom through said cylinder tube and out of one end thereof to operative connection with another part of said vehicle, said piston and rod defining an assembly which is normally forced by said pressurized gas to a predetermined extended and telescoped position with respect to said cylinder tube, a stop tube mounted for rotation and limited axial sliding movement relative to said piston rod and operatively disposed around said piston rod and cylinder tube, and an adjustable stop collar threadly mounted on said cylinder tube, a fixed stop having external splines mounted to said stop tube for engaging said stop collar on said cylinder tube for limiting the outward telescopic stroke of said piston and rod assembly relative to said cylinder tube to thereby limit the degree of opening of said closure with respect to said opening, and said stop collar having internal splines for engaging said external splines so that said adjustable stop collar can be turned by turning said stop tube and moved to different longitudinal locations on said cylinder tube for adjusting the stroke of said gas spring unit.

* * * * *